(12) United States Patent
Hatfield

(10) Patent No.: US 7,950,180 B2
(45) Date of Patent: May 31, 2011

(54) FISH LURE BREAK AWAY SYSTEM

(76) Inventor: Marcus Craig Hatfield, Fairmont, WV (US)

( * ) Notice: Subject to any disclaimer, the term of this patent is extended or adjusted under 35 U.S.C. 154(b) by 0 days.

(21) Appl. No.: 12/554,733

(22) Filed: Sep. 4, 2009

(65) Prior Publication Data

US 2010/0293834 A1    Nov. 25, 2010

Related U.S. Application Data

(60) Provisional application No. 61/180,834, filed on May 22, 2009, provisional application No. 61/180,927, filed on May 26, 2009.

(51) Int. Cl.
*A01K 85/02*    (2006.01)
*A01K 91/03*    (2006.01)
*A01K 91/04*    (2006.01)

(52) U.S. Cl. .................... 43/43.12; 43/44.83; 43/17.2

(58) Field of Classification Search ............ 43/43.12, 43/43.16, 44.82, 44.83, 44.84, 44.85, 17.2, 43/44.97
See application file for complete search history.

(56) References Cited

U.S. PATENT DOCUMENTS

| | | | | | |
|---|---|---|---|---|---|
| 788,201 | A | * | 4/1905 | Friend | 43/44.82 |
| 794,695 | A | * | 7/1905 | Bagnall | 63/21 |
| 895,493 | A | * | 8/1908 | O'Brien | 43/44.83 |
| 1,497,710 | A | * | 6/1924 | Cole | 24/577.1 |
| 1,961,378 | A | * | 6/1934 | Mitchell | 43/44.8 |
| 1,974,381 | A | * | 9/1934 | Swanson et al. | 43/43.12 |
| 2,138,702 | A | * | 11/1938 | Litsey | 43/44.83 |
| 2,359,588 | A | * | 10/1944 | Shea | 43/43.12 |
| 2,514,527 | A | * | 7/1950 | Verhota | 43/44.82 |
| 2,573,981 | A | * | 11/1951 | Nelson | 43/43.12 |
| 2,619,763 | A | * | 12/1952 | Siebert | 43/42.43 |
| 2,651,134 | A | * | 9/1953 | Kemmerer | 43/43.4 |
| 2,727,332 | A | * | 12/1955 | Benson | 43/44.97 |
| 2,733,537 | A | * | 2/1956 | Elsberg | 43/43.12 |
| 2,756,478 | A | * | 7/1956 | Morrissey | 24/908 |
| 2,768,468 | A | * | 10/1956 | Kibler et al. | 43/43.12 |
| 2,775,057 | A | * | 12/1956 | Ludgate | 43/43.12 |
| 2,796,695 | A | * | 6/1957 | Meulnart | 43/44.86 |
| 2,839,803 | A | * | 6/1958 | Wiselka | 24/908 |
| 2,871,540 | A | * | 2/1959 | Smith | 43/44.83 |
| 3,077,694 | A | * | 2/1963 | Cox | 43/43.12 |
| 3,091,885 | A | * | 6/1963 | Ulsh | 43/43.12 |
| 3,210,883 | A | * | 10/1965 | Ulsh | 43/43.12 |

(Continued)

FOREIGN PATENT DOCUMENTS

DE    19944944 A1 *  4/2001

(Continued)

*Primary Examiner* — Darren W Ark
(74) *Attorney, Agent, or Firm* — Christopher Wood; Daniel Eisenberg; Premier Law Group, PLLC

(57) ABSTRACT

A fish lure break away system, having a lure attachment member, a hook section with at least one elongated shank, an eyelet, an eyelet guide, and a least one curved bend terminating in a tip section. The eyelet defines an eyelet gap having a predetermined width. In one embodiment the lure attachment member has a predetermined breaking strength in combination with a selected thickness and flexibility such that the lure attachment member can be squeezed through the eyelet gap and thereby attached to the eyelet. The lure attachment member may be of strength less than that of fishing line so as to break if snagged to release and avoid loss of a lure. The hook section has an inwardly projecting member which may be maneuvered to close or minimize the eyelet gap to retain the lure attachment member.

8 Claims, 7 Drawing Sheets

U.S. PATENT DOCUMENTS

| | | | | |
|---|---|---|---|---|
| 3,218,751 A * | 11/1965 | Walker | | 43/43.12 |
| 3,518,784 A * | 7/1970 | Moss et al. | | 43/43.12 |
| 3,541,720 A * | 11/1970 | Buffet | | 43/43.12 |
| 3,648,399 A * | 3/1972 | Lloyd | | 43/43.12 |
| 3,683,542 A * | 8/1972 | Pecchio | | 43/44.97 |
| 3,724,116 A * | 4/1973 | Lindner et al. | | 43/44.83 |
| 3,778,918 A * | 12/1973 | Emory et al. | | 43/43.12 |
| 3,785,011 A * | 1/1974 | Marks | | 43/44.83 |
| 3,855,723 A * | 12/1974 | Mc Gahee | | 43/44.83 |
| 3,878,637 A * | 4/1975 | Flower | | 43/44.83 |
| 3,991,505 A * | 11/1976 | Simeti | | 43/43.12 |
| 4,010,569 A * | 3/1977 | Finley et al. | | 43/44.83 |
| 4,125,958 A * | 11/1978 | Cote | | 43/43.12 |
| 4,141,116 A * | 2/1979 | Zalonis | | 43/44.83 |
| 4,171,587 A * | 10/1979 | Bullen, Jr. | | 43/17.2 |
| 4,215,505 A * | 8/1980 | Henze et al. | | 43/43.1 |
| 4,494,334 A * | 1/1985 | Porter | | 43/43.12 |
| 4,535,562 A * | 8/1985 | Fry | | 43/44.83 |
| 4,538,372 A * | 9/1985 | Petigoretz | | 43/43.12 |
| 4,642,933 A * | 2/1987 | Brown | | 43/43.12 |
| 4,691,467 A * | 9/1987 | Brimmer | | 43/44.4 |
| 4,696,121 A * | 9/1987 | Hernden | | 43/17.2 |
| 4,821,449 A * | 4/1989 | Hafer | | 43/43.12 |
| 5,076,006 A * | 12/1991 | Kahng | | 43/43.12 |
| 5,165,197 A * | 11/1992 | Sitton | | 43/44.83 |
| 5,212,901 A * | 5/1993 | Bishop et al. | | 43/42.72 |
| 5,237,772 A * | 8/1993 | Gibbs | | 43/43.16 |
| 5,265,370 A * | 11/1993 | Wold | | 43/44.82 |
| 5,351,434 A * | 10/1994 | Krenn | | 43/44.91 |
| 5,375,365 A * | 12/1994 | Bronder | | 43/43.12 |
| 5,499,472 A * | 3/1996 | Krenn | | 43/43.1 |
| D376,836 S * | 12/1996 | Banks et al. | | D22/144 |
| 5,579,600 A * | 12/1996 | Burns | | 43/44.83 |
| 5,735,072 A * | 4/1998 | Cook et al. | | 43/43.16 |
| 5,901,493 A * | 5/1999 | Tolliver | | 43/44.82 |
| 5,901,495 A * | 5/1999 | Leigeber | | 43/44.83 |
| 5,970,650 A * | 10/1999 | Mammel | | 43/44.83 |
| 6,073,385 A * | 6/2000 | Sano | | 43/44.83 |
| 6,076,297 A * | 6/2000 | Lippincott | | 43/44.87 |
| 6,189,256 B1 * | 2/2001 | Boys | | 43/43.12 |
| 6,192,619 B1 * | 2/2001 | Pirkle | | 43/43.12 |
| 6,305,120 B1 * | 10/2001 | Boys | | 43/43.12 |
| D451,579 S | 12/2001 | Yong-Set | | |
| 6,334,273 B2 * | 1/2002 | Turner et al. | | 43/44.83 |
| 6,460,225 B1 * | 10/2002 | Brault | | 24/115 F |
| 6,560,916 B1 * | 5/2003 | Maxim | | 43/44.83 |
| 6,722,079 B2 * | 4/2004 | Schumer | | 43/17.2 |
| 6,748,694 B1 * | 6/2004 | Darling | | 43/43.12 |
| 6,760,997 B1 * | 7/2004 | Mammel | | 43/44.83 |
| D501,039 S * | 1/2005 | Duncan | | D22/144 |
| 7,155,858 B2 * | 1/2007 | Caldwell | | 43/44.83 |
| 7,197,847 B2 * | 4/2007 | Albrant, Jr. | | 43/43.12 |
| 7,621,072 B2 * | 11/2009 | Brasseur | | 43/44.97 |
| D609,304 S * | 2/2010 | Hatfield | | D22/144 |
| 7,669,360 B2 * | 3/2010 | Davidson | | 43/17.2 |
| 7,676,984 B2 * | 3/2010 | Mark | | 43/42.72 |
| 7,735,256 B2 * | 6/2010 | Hatfield | | 43/43.12 |
| 2003/0051390 A1 * | 3/2003 | Boys | | 43/43.12 |
| 2006/0090390 A1 * | 5/2006 | Barth | | 43/43.12 |
| 2006/0185221 A1 * | 8/2006 | Burns | | 43/44.83 |
| 2006/0196105 A1 * | 9/2006 | Michlitsch | | 43/44.83 |
| 2006/0218847 A1 * | 10/2006 | Otsubo | | 43/44.83 |
| 2006/0265939 A1 * | 11/2006 | Friedrichs | | 43/44.83 |
| 2007/0119092 A1 * | 5/2007 | Gruber | | 43/44.83 |
| 2007/0227060 A1 * | 10/2007 | Mammel | | 43/44.83 |
| 2008/0047192 A1 * | 2/2008 | Bennis | | 43/43.16 |
| 2009/0313878 A1 * | 12/2009 | Taylor | | 43/44.83 |
| 2010/0024277 A1 * | 2/2010 | Ross | | 43/44.83 |
| 2010/0325939 A1 * | 12/2010 | Frayne | | 43/44.83 |

FOREIGN PATENT DOCUMENTS

| | | | |
|---|---|---|---|
| GB | 2100103 A * | 12/1982 | |
| GB | 2281684 A * | 3/1995 | |
| GB | 2304513 A * | 3/1997 | |
| GB | 2344734 A * | 6/2000 | |
| GB | 2383932 A * | 7/2003 | |
| JP | 04166031 A * | 6/1992 | |
| JP | 05308874 A * | 11/1993 | |
| JP | 08277829 A * | 10/1996 | |
| JP | 08280306 A * | 10/1996 | |
| JP | 09275863 A * | 10/1997 | |
| JP | 10084825 A * | 4/1998 | |
| JP | 10210905 A * | 8/1998 | |
| JP | 10276640 A * | 10/1998 | |
| JP | 11146745 A * | 6/1999 | |
| JP | 11169023 A * | 6/1999 | |
| JP | 2001157530 A * | 6/2001 | |
| JP | 2002204642 A * | 7/2002 | |
| JP | 2003079278 A * | 3/2003 | |
| JP | 2003210087 A * | 7/2003 | |
| JP | 2004236519 A * | 8/2004 | |
| JP | 2004313085 A * | 11/2004 | |
| JP | 2005348709 A * | 12/2005 | |
| JP | 2006067924 A * | 3/2006 | |
| JP | 2006174724 A * | 7/2006 | |
| JP | 2008188005 A * | 8/2008 | |
| JP | 2009268461 A * | 11/2009 | |
| WO | WO 9712514 A1 * | 4/1997 | |
| WO | WO 9749280 A1 * | 12/1997 | |
| WO | WO 9834475 A1 * | 8/1998 | |
| WO | WO 03067875 A1 * | 8/2003 | |
| WO | WO 2006127029 A2 * | 11/2006 | |

* cited by examiner

FISH LURE BREAK AWAY SYSTEM

CROSS-REFERENCE TO RELATED APPLICATIONS

This application claims the benefit of priority from U.S. Patent Application Ser. Nos. 61/180,834 (filed: May 22, 2009) and 61/180,927 (filed: May 26, 2009). The entire content of U.S. Patent Application Ser. Nos. 61/180,834 and 61/180,927 are explicitly incorporated by reference herein in their entirety.

STATEMENT REGARDING FEDERALLY SPONSORED RESEARCH OR DEVELOPMENT

Not Applicable.

FIELD OF THE INVENTION

This invention relates to an apparatus for sport fishing and particularly, to a breakaway hook and loop system which helps prevent the loss of a fish lure when the hook becomes snagged.

BACKGROUND OF THE INVENTION

As noted in U.S. Pat. No. 4,696,121, sport fishermen have long been plagued with losing fishing lures when the hook becomes entangled with underwater objects. Normally, when such entanglement occurs, the fisherman cuts the fishing line or tries to pull it free until the fishing line fails resulting in a loss of the lure. The potential for such loss necessitates that the angler must bring a number of lures with him during a fishing outing. Moreover, loss of lures translates into a loss of a considerable sum of money over the course of a fishing season.

There is a need for better ways of reducing the risk of losing fishing lures when a fish hook snags an environmental object.

SUMMARY OF THE INVENTION

A fish lure break away system, having a lure attachment member, a hook section with at least one elongated shank, an eyelet, an eyelet guide, and a least one curved bend terminating in a tip section. The eyelet defines an eyelet gap having a predetermined width. In one embodiment the lure attachment member has a predetermined breaking strength in combination with a selected thickness and a selected flexibility such that the lure attachment member can be squeezed by a user through the eyelet gap and thereby attached to the eyelet.

The hook may be formed from wire stock, and may have an inwardly turned tang or forearm which projects from an elbow formed in the eyelet of the hook.

DETAILED DESCRIPTION OF THE INVENTION

This invention is directed to a fish lure break away system. The fish lure break away system of the invention is denoted generally by the numeric label "100".

Referring to the Figures in general, the fish lure break away system 100 comprises a lure attachment member 120 and a hook section 140 adapted to attach directly to the lure attachment member 120 as described below. In normal use the lure attachment member 120 is used to attach the hook section 140 to an artificial fish lure 150 (see FIG. 2).

Figure 3A:
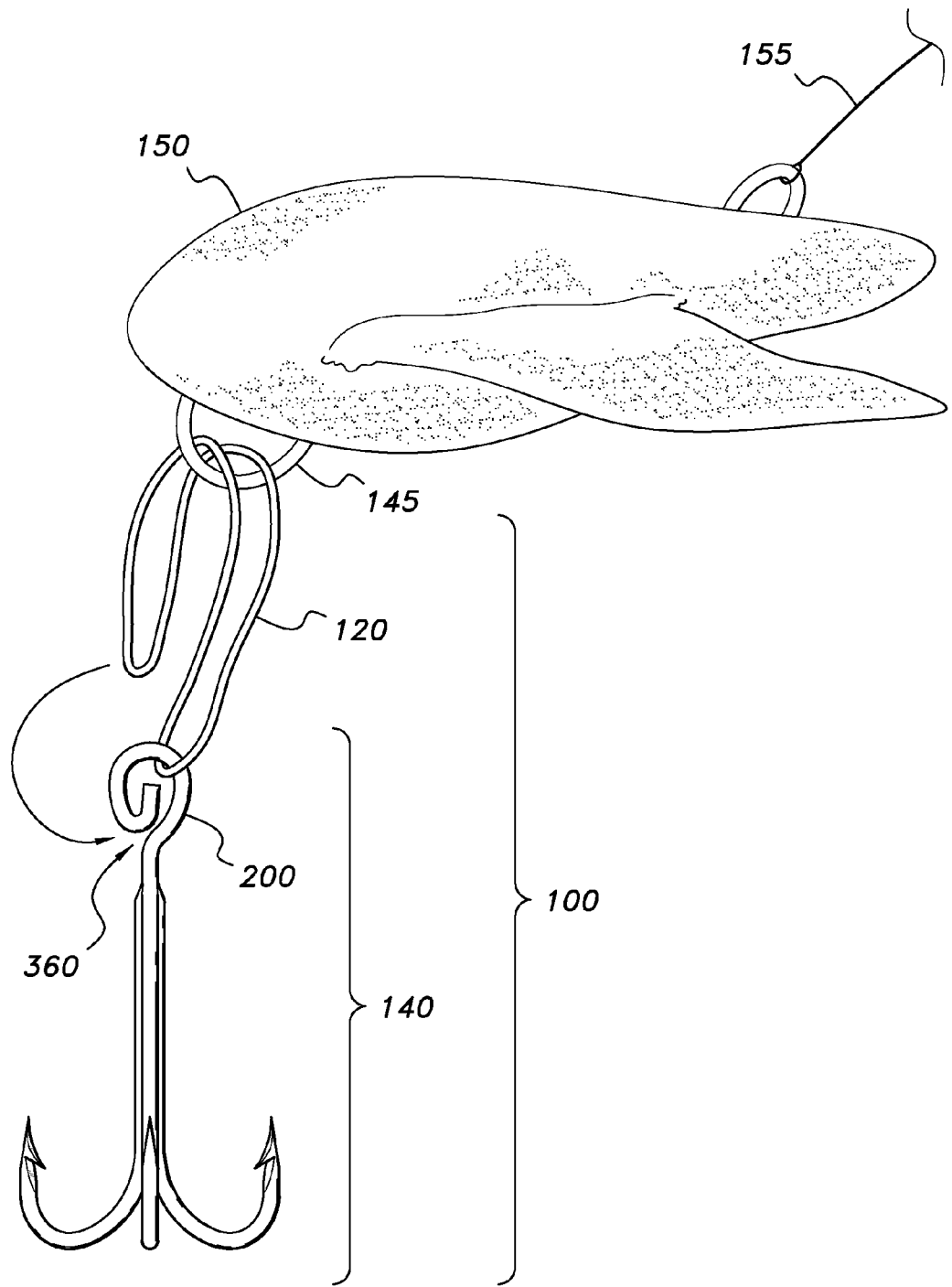
FIG. 3A shows an environmental view of a fish lure break away system according to the present invention.
Figure 3B:
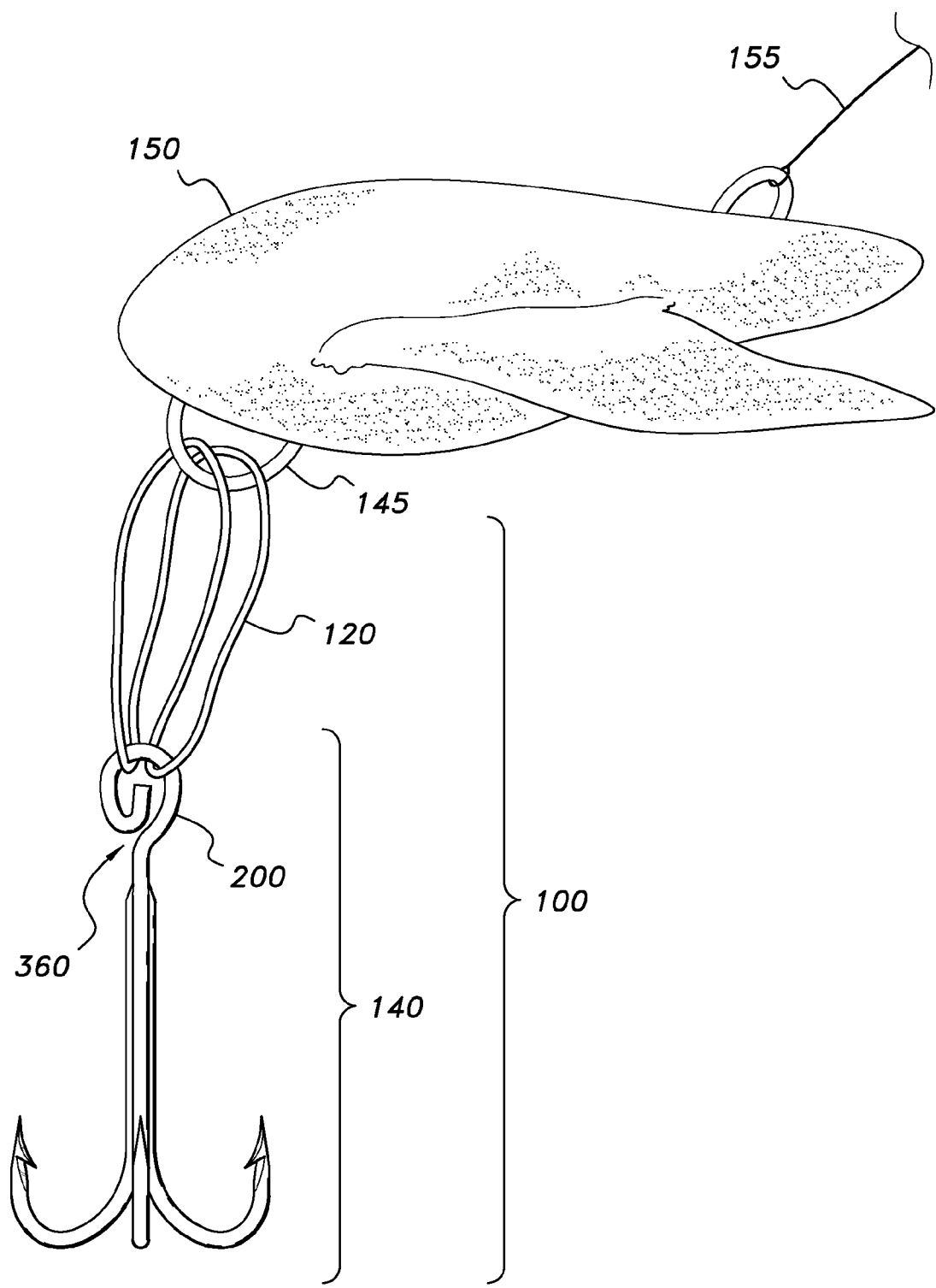
FIG. 3B shows an environmental view of a fish lure break away system according to the present invention.

The lure attachment member 120 has a predetermined breaking strain. The lure attachment member 120 can be in the form of a continuous loop or band. The lure attachment member 120 is sufficiently flexible to allow a person to bend it back 180° (i.e., 180 degrees) on itself to double loop the eyelet 200 as shown in FIGS. 3A and 3B, thereby allowing the lure attachment member 120 to be secured, for example, to a split ring 145 of the artificial fish lure 150.

The hook section 140 comprises at least one elongated shank 180, an eyelet 200, an eyelet forearm 330, and at least one curved bend 240. The at least one elongated shank 180 defines opposed first 260 and second 280 ends. Although depicted as straight in FIG. 1, the at least one elongated shank 180 may be straight or curved.

The lure attachment member 120 could be a band made of elastomeric compound such as, but not limited to, synthetic rubber compound with a selected breaking strain. For example, the lure attachment member 120 can be made out of olefinic elastomers such as EPDM (ethylene-propylene-diene monomer). For example, the lure attachment member 120 can be made out of ethylene-propylene copolymer (EPM). A lure attachment member 120 made out of a flexible elastomer compound could be squeezed or otherwise forced through an eyelet gap 360 in eyelet 200.

For example, the lure attachment member 120 could be made out of a high ethylene-containing olefinic elastomer, such as ethylene-propylene (EP), ethylene-propylene-diene monomer (EPDM), ethylene-butene, ethylene-pentene, ethylene-hexene, ethylene-heptene, ethylene-octene, and the like, where the ethylene content of the high ethylene-containing elastomer is greater than about 50% by weight based on the weight of the elastomer; alternatively the ethylene content is about 70 to 95% weight based on the weight of the elastomer.

Alternatively, the lure attachment member 120 can be made out of any suitable material such as a plastic polymer, e.g., nylon, thermoplastic polyethylene, or Dacron (i.e., Polyethylene terephthalate).

The various parts of the hook section 140 can be made out of any suitable material such as metal. For example, the hook section 140 can be made from round wire made from carbon steel or stainless steel; however, other materials can be used and the wire can have a shape other than round in cross-section.

During normal use the fish lure break away system 100 may be attached to the artificial fish lure 150, and the artificial fish lure 150 may in turn be attached to a fishing line 155 (see FIG. 3B). The predetermined breaking strength of the lure attachment member 120 is selected to be less than the breaking strength of the fishing line 155 attached to the artificial fish lure 150 (see, e.g., FIG. 3B). The predetermined breaking strength of the lure attachment member 120 can vary from 1 lb (one pound-mass) to 40 lbs (forty pounds-mass) in ½ lb (half pounds-mass) increments, i.e., 1 lb, 1.5 lbs, 2 lbs . . . 40 lbs). The predetermined breaking strength of the lure attachment member 120 is selected to be less than the breaking strain of the fishing line 155. More specifically, the breaking strain is selected based on the final configuration of the lure attachment member 120 with respect to the eyelet 200 and the lure 150. For example, a double back configuration of the lure attachment member 120 is shown in FIG. 3B where the lure attachment member 120 is shown inserted once through a split ring 145 and attached twice to eyelet 200 (see FIGS. 3A and 3B) by threading the lure attachment member 120 through eyelet gap 360 and then through ring 145 and then once more through eyelet gap 360. Thus, if the fishing line 155 in FIG. 3B has a breaking strain of 10 lbs (ten pounds-mass) the lure attachment member 120 in the configuration shown in FIG. 3B can have a breaking strain of less than 10 lbs, e.g., 7 lbs (seven pounds-mass) and in this example the set-up shown in FIG. 3B could be used in fishing for fish of less than 7 lbs (seven pounds-mass).

For example, lure attachment member 120 with 6 lbs (six pounds-mass) breaking strength can be used in conjunction with a fishing line with 9 lbs (nine pounds-mass) breaking strength. Thus, if the hook becomes stuck in, for example, weeds the artificial fish lure 150 can be saved by applying sufficient load on the fishing line 155 sufficient to break the lure attachment member 120, but not sufficient to break the fishing line 155 attached to the artificial fish lure 150.

Figure 4:
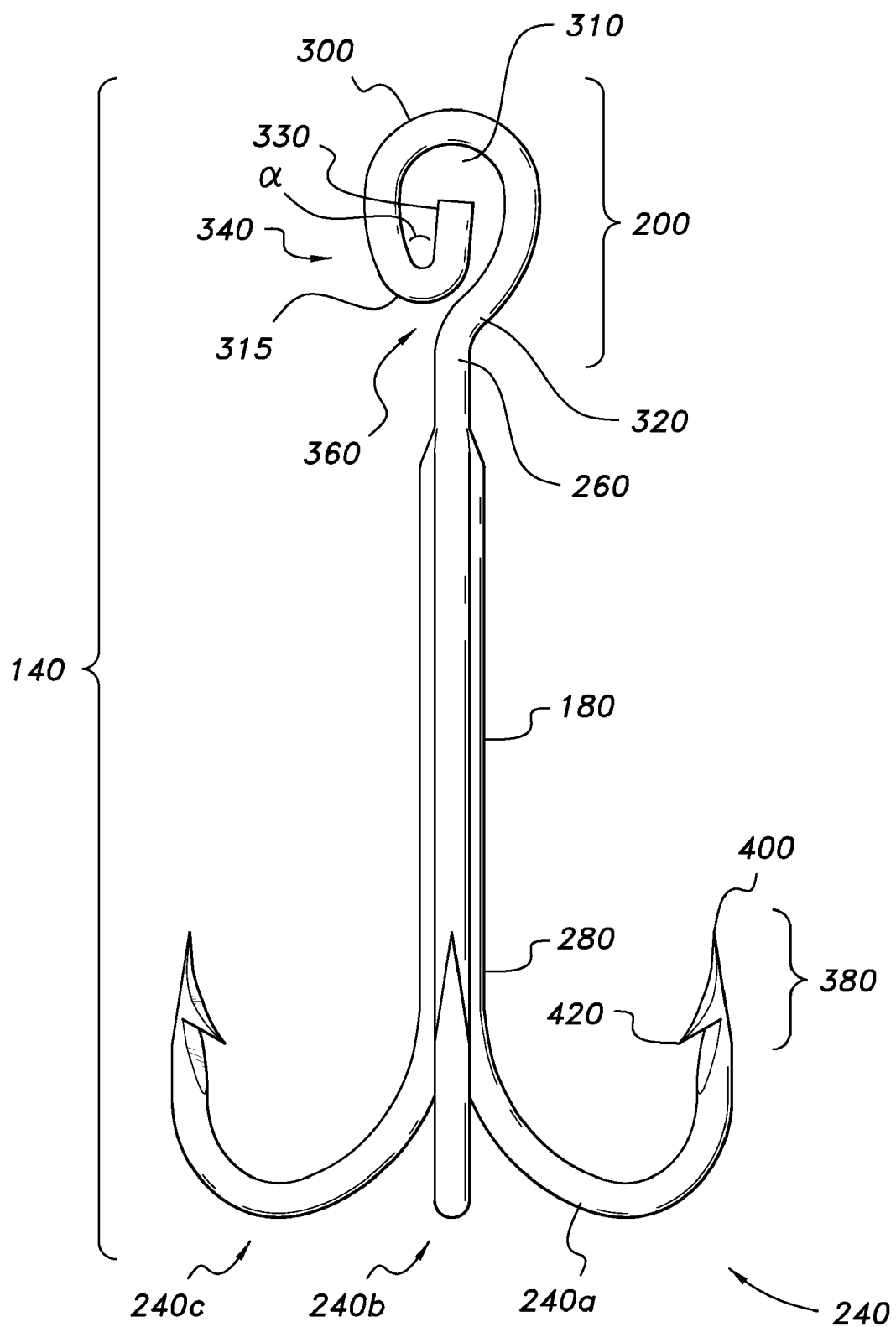
FIG. 4 shows a side view of a hook according to the present invention.

As better seen in FIG. 4, the eyelet 200 defines a discontinuous loop 300 having first end 320 and second end 340. The first end 320 of the eyelet 200 is attached to and integral with the first end 260 of the at least one elongated shank 180, the second end 340 of the eyelet 200 is located proximate to but separate from the first end 260 of the at least one elongated shank 180 with an eyelet gap 360 interposed between the first 320 and second end 340 of the eyelet 200. The at least one curved bend 240 may comprise one, two, three, or four curved bends. For example, FIG. 4 shows a hook 140 comprising three curved bends respectively labeled 240a, 240b, and 240c. Details of construction of the curved bend 240a are set forth explicitly herein, it being understood that the remaining curved bends such as the curved bends 240b and 240c may be essentially identical to the curved bend 240a. The at least one curved bend 240 extends from the second end 280 of the at least one elongated shank 180, and terminates in a tip section 380. The tip section 380 has a sharp point 400 and optionally has a barb 420.

The discontinuous loop 300 defines an interior void 310 therein. An elbow 315 is formed in the eyelet 200 at the second end 340. A forearm 330 projects from the elbow 315 towards the interior void 310 of the interior loop, forming a non-parallel angle included between the discontinuous loop 300 and the forearm 330. The non-parallel angle is represented by the Greek letter symbol alpha in FIG. 4.

Figure 2:
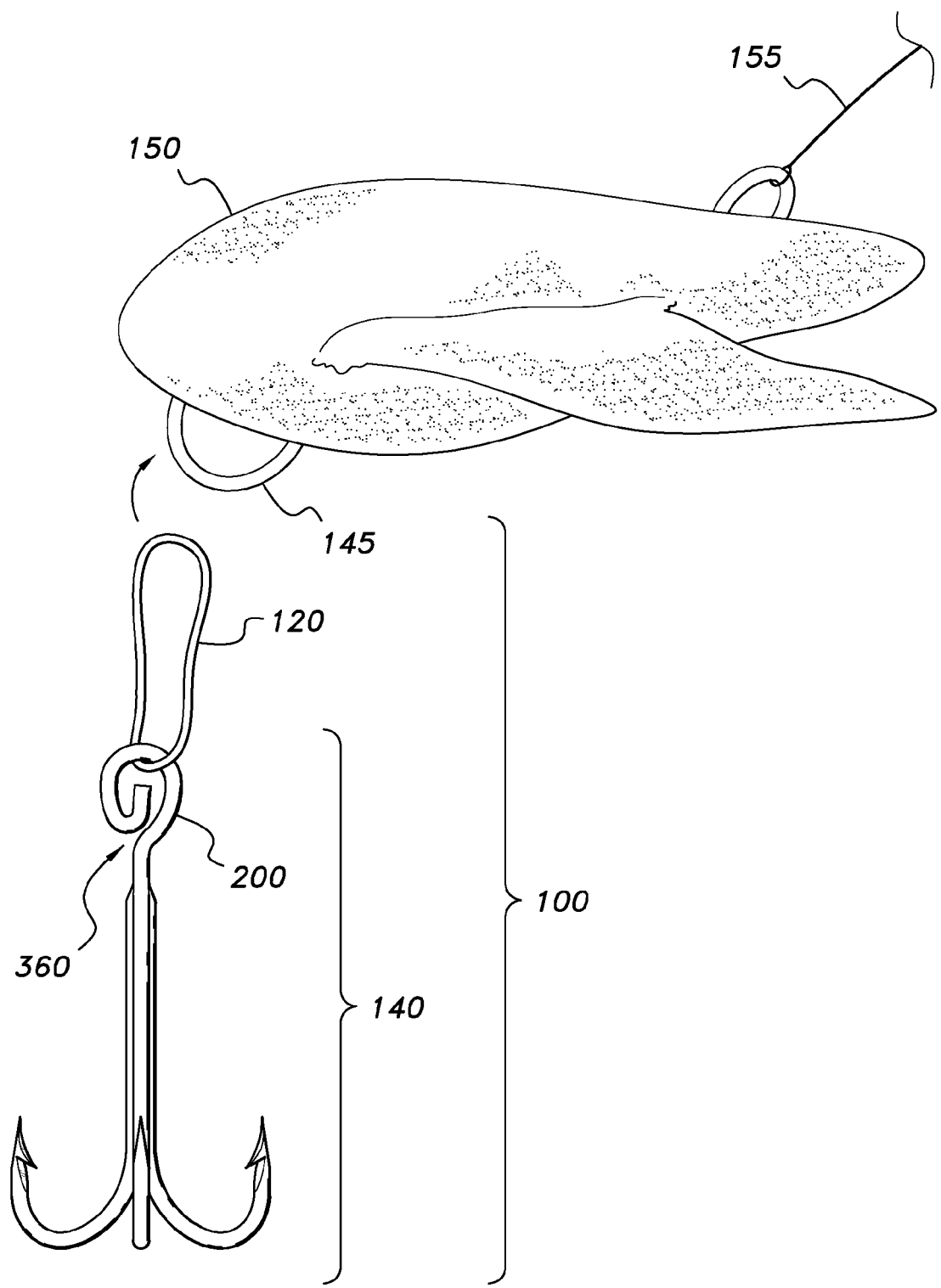
FIG. 2 shows an environmental view of a fish lure break away system according to the present invention.

In normal use the lure attachment member 120 may be passed through the eyelet gap 360 and into the interior void 310, as seen in FIGS. 2, 3A, and 3B. The lure attachment member 120 may be retained on the eyelet by closing the eyelet gap 360 sufficiently to prevent the lure attachment member from slipping from engagement with the eyelet 200. This can be performed for example by grasping the forearm 330 with a suitable tool such as needlenose pliers (not shown) and maneuvering the forearm 330 until the eyelet gap 360 is suitably closed. Abutment of the second end 340 of the eyelet 200 with the first end 260 of the shank 180 is not necessary, although the eyelet gap 360 may be fully closed if desired.

Figure 5:
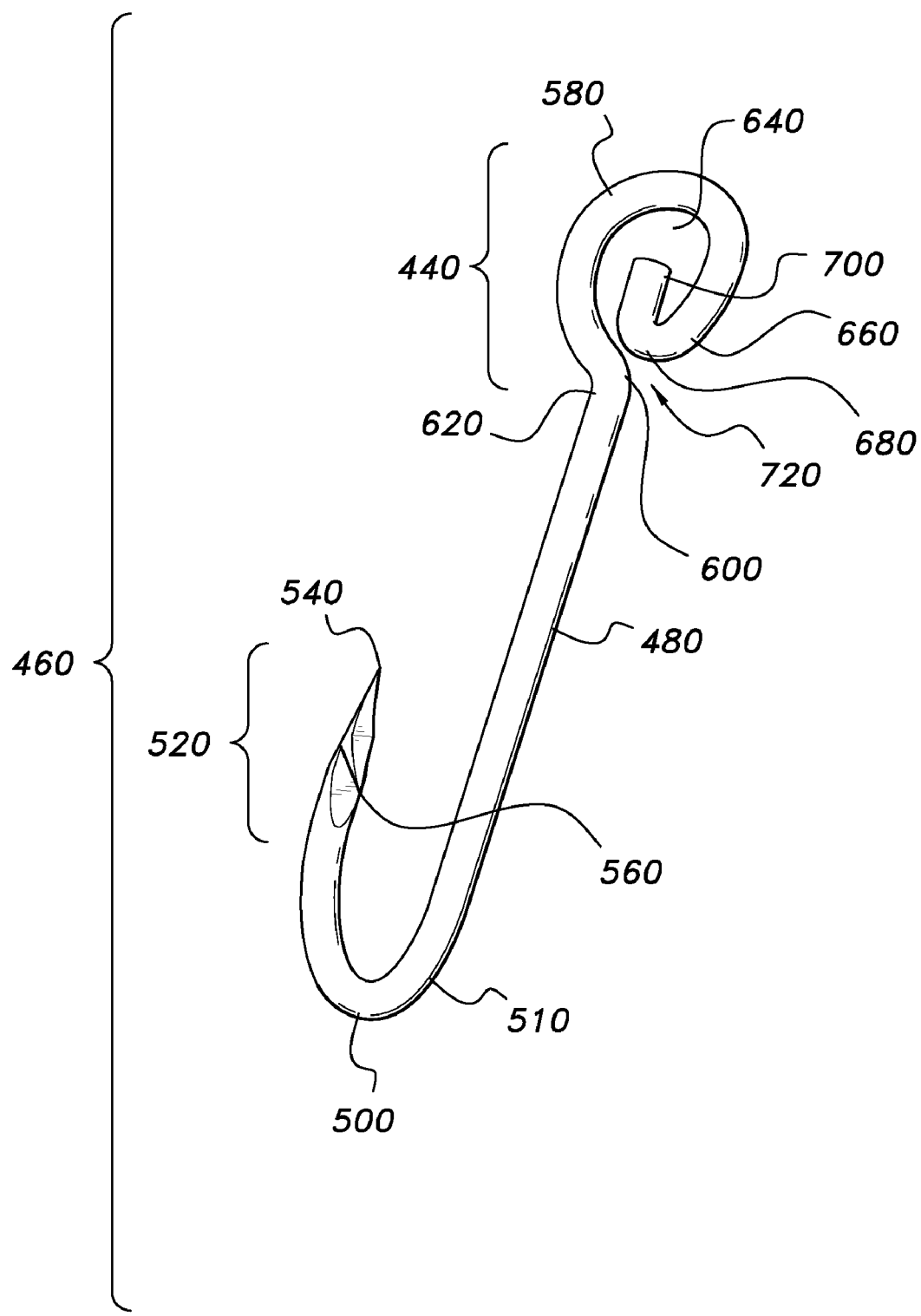
FIG. 5 shows a perspective view of another hook according to the present invention.

The above recited construction of the eyelet 200 may be applied to hooks having construction other than that of the hook 140. Referring to FIG. 5, the above recited construction of the eyelet 200 may be repeated for an eyelet 440 of a hook 460. The hook 460 may have a single elongated shank 480 comprising a single curved bend 500 located at the second end 510 of the elongated shank 480 and a single tip section 520. The tip section 520 may have a sharp point 540 and optionally a barb 560.

The eyelet 440 may comprise a discontinuous loop 580 having a first end 600 connected to and integral with a first end 620 of the elongated shank 480. The discontinuous loop 580 may define an interior void 640 therein. The discontinuous loop 580 may have a second end 660 at which an elbow 680 is formed. A forearm 700 may project from the elbow into the interior void 640. An eyelet gap 720 may exist between the first end 600 and the second end 660 of the discontinuous loop 580. A lure attachment member such as the lure attachment member 120 of FIG. 1 may be connected to the eyelet 440 of the hook 460 in a manner identical to that by which the lure attachment member 120 is connected to its associated hook member 140.

Figure 6:
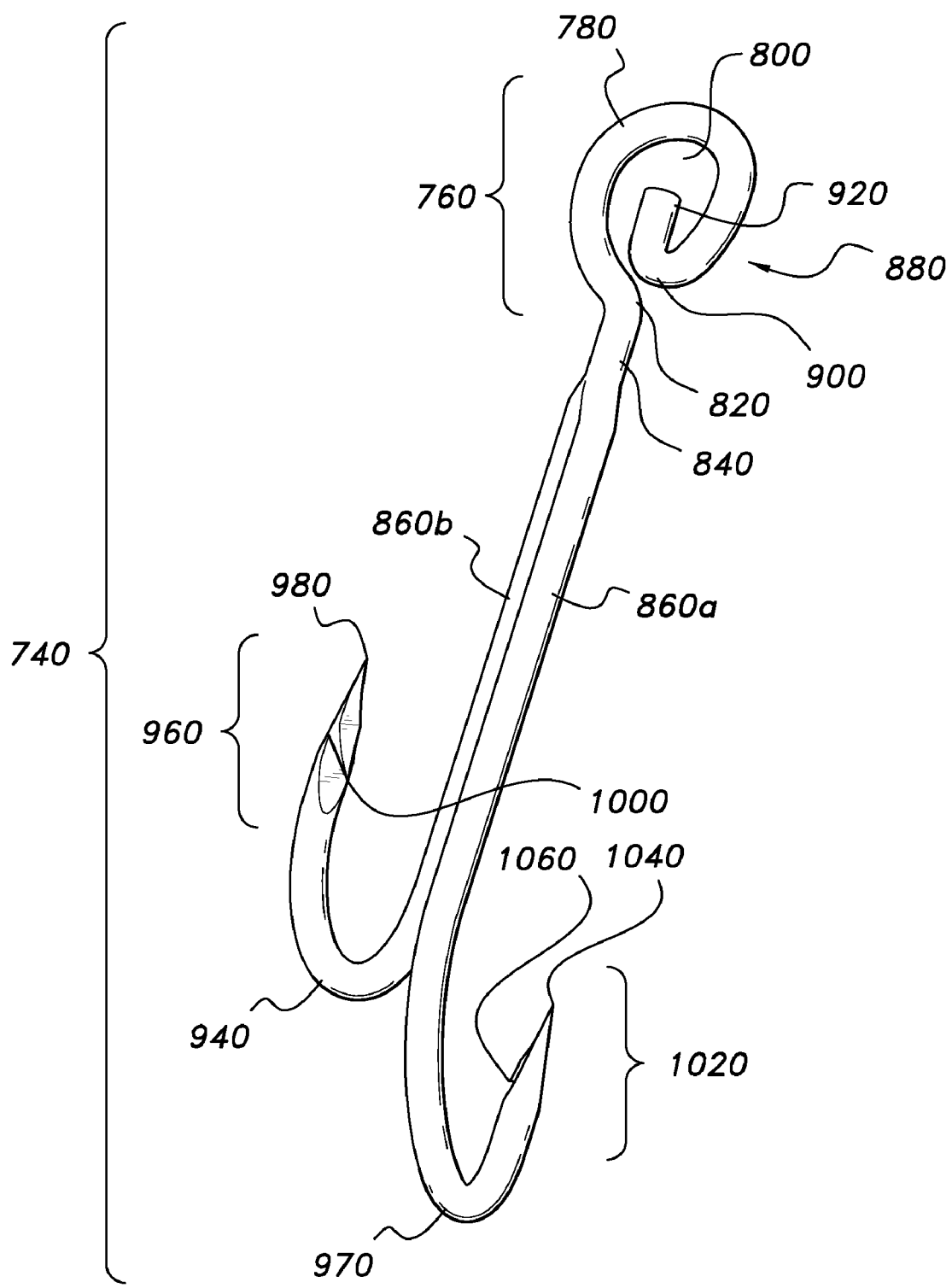
FIG. 6 shows a perspective view of still another hook according to the present invention.

As seen in FIG. 6, the construction set forth above may be applied to a hook 740. The hook 740 may comprise an eyelet 760 which is the structural and functional equivalent of the eyelet of FIG. 4 for example, comprising a discontinuous loop 780 defining an interior void 800 therein, and having a first end 820 connected to and integral with a first end 840 of an elongated shank 860 and a second end 880. An elbow 900 may be formed in the discontinuous loop 780 at the second end 880 of the discontinuous loop 780. A forearm 920 may project from the elbow 900 towards the interior void 800.

The elongated shank 860 may have two single curved bends 940, 960. The curved bend 940 may terminate in a tip section 960 which in turn may have a sharp point 980 and optionally a barb 1000. The curved bend 960 may terminate in a tip section 1020 which in turn may have a sharp point 1040 and optionally a barb 1060.

The hook 140 of FIG. 4 will be recognizable to fishermen as a treble hook having three curved bends 240a, 240b, and 240c and three associated sharp points such as the sharp point 400. The hook 740 of FIG. 6 will be recognizable to fishermen as a double hook having two curved bends 940, 970 and two associated sharp points 980 and 1040. The principles of the invention are equally applicable to singlet hooks such as the hook 460 of FIG. 5 and hooks (not shown) having more than three curved bends and associated sharp points.

The shank of any hook having more than one curved bend according to the present invention may be made by taking curved bends having individual shanks attached to each, and optionally brazing the two shanks together to form a resultant elongated shank. For example, the elongated shank 860 of the hook 740 of FIG. 6 may be made by brazing the individual shank 860a of the curved bend 960 to the individual shank 860b of the curved bend 940. The eyelet 760 may be formed by bending constituent wire or rod stock of the individual shank 860a.

A treble shank as seen in the hook 140 of FIG. 4 may be made by taking three curved bends with individual shanks attached to each curved bend and optionally brazing all three shanks together to provide the elongated shank 180 and adding or fashioning a single eyelet such as the eyelet 200 of the present invention to the first end 260. The eyelet 200 may be formed by bending constituent wire or rod stock of one individual shank of the elongated shank 180.

A hook (not shown) having four or more curved bends may be provided according to further aspects of the invention. The elongated shank of such a hook may optionally be made by joining the individual shanks associated with the four or more curved bends.

A hook according to at least one aspect of the invention such as the hook 140 may be formed monolithically from a metallic material. Monolithic construction will be understood to be construed after final fabrication of the hook. That is, the hook may be fabricated by joining several pieces of metallic constituent parts together. After joining, the finished hook is regarded as monolithic as long as it is fabricated entirely from one or more metals or metal alloys.

It will also be seen that the eyelet of a hook according to at least one aspect of the invention, such as the eyelet 200 of the hook 140 may be formed from wire stock having substantially constant diameter along its length. Thus the eyelet may be formed by bending the wire stock appropriately. The wire stock may be an extension of wire stock used to form an elongated shank such as the elongated shank 180. The elongated shank may in turn be formed as an extension of wire stock employed to form a curved bend such as the curved bends 240*a*, 240*b*, 240*c*.

Figure 1:
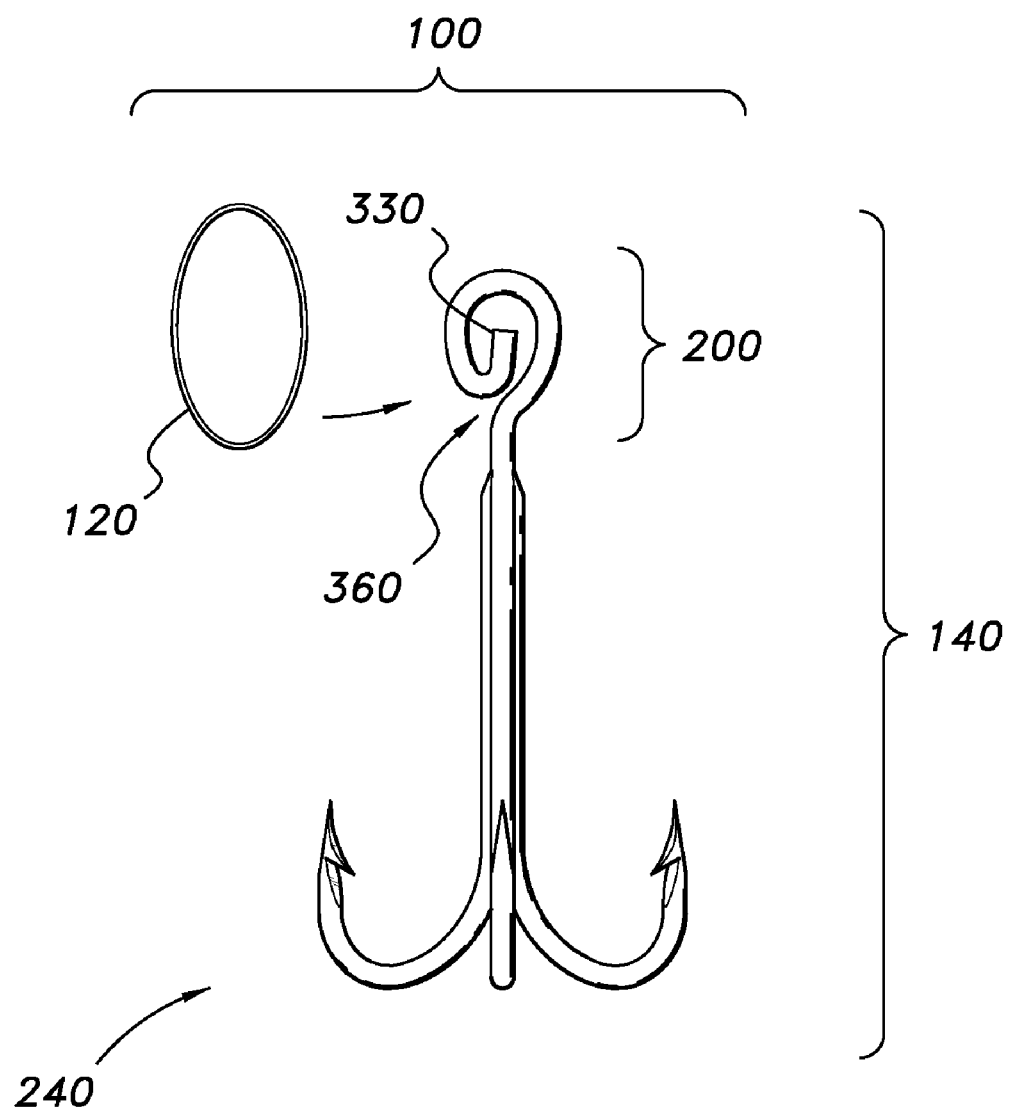
FIG. 1 shows a side view of one embodiment of a fish lure break away system according to the present invention.

The invention may be regarded as a system including a lure attachment member and a hook according to at least one aspect of the invention, such as the system 100 of FIG. 1. Alternatively, the invention may be regarded as a fishing hook according to at least one aspect of the invention, such as the hook 140 of FIG. 1.

The invention being thus described, it will be evident that the same may be varied in many ways by a routineer in the applicable arts. Such variations are not to be regarded as a departure from the spirit and scope of the invention and all such modifications are intended to be included within the scope of the claims.

What is claimed:

1. A fish lure break away system for use with fishing apparatus including an artificial fish lure and a fishing line connected to the artificial fish lure, wherein the fishing line has a predetermined breaking strain, the system comprising:
   an artificial fish lure with a ring;
   a lure attachment member, wherein said lure attachment member comprises a continuous loop structure, said lure attachment member has a predetermined breaking strain less than the breaking strain of the fishing line, and said lure attachment member is sufficiently flexible to allow a person to bend said lure attachment member 180° back on itself; and
   a hook section, said hook section comprising at least one elongated shank having a first end and an opposed second end, an eyelet joined to said at least one elongated shank at said first end of said at least one elongated shank, wherein at least one curved bend is joined to and extends from said at least one elongated shank at said second end of said at least one elongated shank, wherein
   said eyelet comprises a discontinuous loop having a first end and a second end and defining an interior void therein, wherein said lure attachment member connects said eyelet to said ring of said artificial lure,
   said first end of said eyelet is attached to and integral with the first end of said at least one elongated shank,
   said second end of said eyelet is located proximate to but separate from said first end of said at least one elongated shank, an eyelet gap is interposed between said first end of said eyelet and said second end of said eyelet,
   said eyelet comprises an elbow formed at said second end of said discontinuous loop and a forearm projecting from said elbow towards said interior void of said eyelet at a non-parallel angle with respect to said discontinuous loop, said forearm having a free end located within said interior void, and
   wherein each one of said at least one curved bend terminates in a tip section comprising a sharp point.

2. The fish lure break away system of claim 1, wherein said hook section comprises a treble hook.

3. The fish lure break away system of claim 1, wherein said hook section comprises a double hook.

4. The fish lure break away system of claim 1, wherein said hook section comprises a single hook.

5. The fish lure break away system of claim 1, wherein said eyelet is formed from wire stock having substantially constant diameter along its length.

6. The fish lure break away system of claim 1, wherein said forearm forms a non-parallel included angle with said discontinous loop of said eyelet.

7. The fish lure break away system of claim 1, wherein said lure attachment member is formed from a synthetic resin.

8. The fish lure break away system of claim 1, wherein said hook section is formed monolithically from metallic material.

* * * * *